United States Patent
Gallagher

[15] 3,661,668
[45] May 9, 1972

[54] METHOD OF MAKING A PNEUMATIC TIRE WITH REDUCED SUSCEPTIBILITY TO BLOW OR BLISTER DEFECTS

[72] Inventor: William C. Gallagher, Akron, Ohio

[73] Assignee: The Goodyear Tire & Rubber Company, Akron, Ohio

[22] Filed: Apr. 1, 1970

[21] Appl. No.: 31,453

Related U.S. Application Data

[62] Division of Ser. No. 667,244, Sept. 12, 1967, Pat. No. 3,552,468.

[52] U.S. Cl............................................................156/133
[51] Int. Cl.......................................................B29h 17/28
[58] Field of Search...............57/140 BY, 144, 160; 152/354, 152/355, 356, 357, 358, 359; 156/110 R, 110 C, 123, 133, 134, 409

[56] References Cited

UNITED STATES PATENTS 1,696,847  12/1928  Irrgang.................................156/409
2,992,150  7/1961  Goy....................................57/140 BY Primary Examiner—Benjamin A. Borchelt
Assistant Examiner—Stephen C. Bentley
Attorney—F. W. Brunner and R. S. Washburn

[57] ABSTRACT

Pneumatic tires and like mold-cured cord reinforced elastomeric articles are rendered less susceptible to blow or blister defects by combining with the continuous filament strength cord auxiliary gas receiving voids provided by a small yarn of staple fiber thereby increasing the total voids volume and enabling contained air or gas to be safely retained within the tire or article.

The foregoing abstract is not to be taken as limiting the invention of this application, and in order to understand the full nature and extent of the technical disclosure of this application, reference must be made to the accompanying drawing and the following detailed description.

5 Claims, 6 Drawing Figures

Patented May 9, 1972 3,661,668

INVENTOR.
WILLIAM C. GALLAGHER
BY Harlan E. Hummer
ATTORNEY

METHOD OF MAKING A PNEUMATIC TIRE WITH REDUCED SUSCEPTIBILITY TO BLOW OR BLISTER DEFECTS

This is a division of application, Ser. No. 667,244, filed Sept. 12, 1967, now U.S. Pat. No. 3,552,468, granted Jan. 5, 1971.

The present invention relates to pneumatic tires and particularly to reinforcement cords and cord fabric used in making pneumatic tires. The invention provides for reducing the occurrence of defects, known as blows or blisters, which occur in the curing of tires.

In the curing of a pneumatic tire the presence of air or other compressible gases within the body of the tire being cured accounts for defects which are known as blows or blisters. These defects are characterized by a local separation between the rubber and one or more of the reinforcement cords which make up the fabric of the reinforcing plies in the tire. Air may become trapped in or between the layers of materials which are superimposed in the course of building the tire, or may in some instances enter into the body of the tire during the time lapse between the building of the tire and the placing of the tire into a mold in which it will be cured. Occasionally small but harmful quantities of air may be forced into the body of the tire by the closing in the mold of otherwise harmless but imperfectly completed splices.

It has been known in the art that reinforcement cords contain passages, generally throughout the cord length, lying between and bounded by the sidewalls of the filaments of which the cords are made, and that air or other gases can travel along such passages. It has been observed that the treatment of tire reinforcement cords of the continuous synthetic resin filament materials such as polyester and nylon tends to reduce the cross-sectional area of the inter-filamentary passages significantly. Treatments which have this effect are generally characterized by the step of hot-stretching of the cords which results in a reduction in the cross-sectional area of the individual filaments and a compacting of the filaments more closely to one another, usually accompanied by a change in the cross-sectional shape of the individual filaments.

When a tire mold is closed and heat and pressure are applied to a tire body therein, air and other gases present within the tire body tend to accumulate generally in the portions of the tire where the relatively impervious rubber layers are thickest, such as in and near the shoulders of the tire. Air so trapped may be sufficient in volume to prevent the development of a satisfactory adhesive bond between the rubber material and the reinforcing material within the tire, or may break such bonds as may have been formed by forcing a separation between the rubber and the reinforcement ply. The resulting defects are known as blisters or blows. Heretofore endeavors to reduce or eliminate these defects have been directed almost entirely, first, to keeping the air or other gases out of the tire body during the building of the tire, and second, to methods and devices which would conduct air which might have been trapped within the tire out to the surrounding atmosphere.

The present invention comprises the discovery that compressible gases, such as air, can be safely and effectively retained within the tire body in sufficient quantity so as to reduce, or in well regulated production, eliminate the occurrence of blisters or blows by the methods and means to be described herein.

The invention will be described herein in terms of certain presently preferred embodiments by way of example, it being understood that scope of the invention is set forth in the claims appended hereto. Objects, features and advantages of the present invention will become apparent, or will be particularly pointed out, as the description proceeds, reference being made throughout to the accompanying drawings in which;

Figures 1, 2, 3:
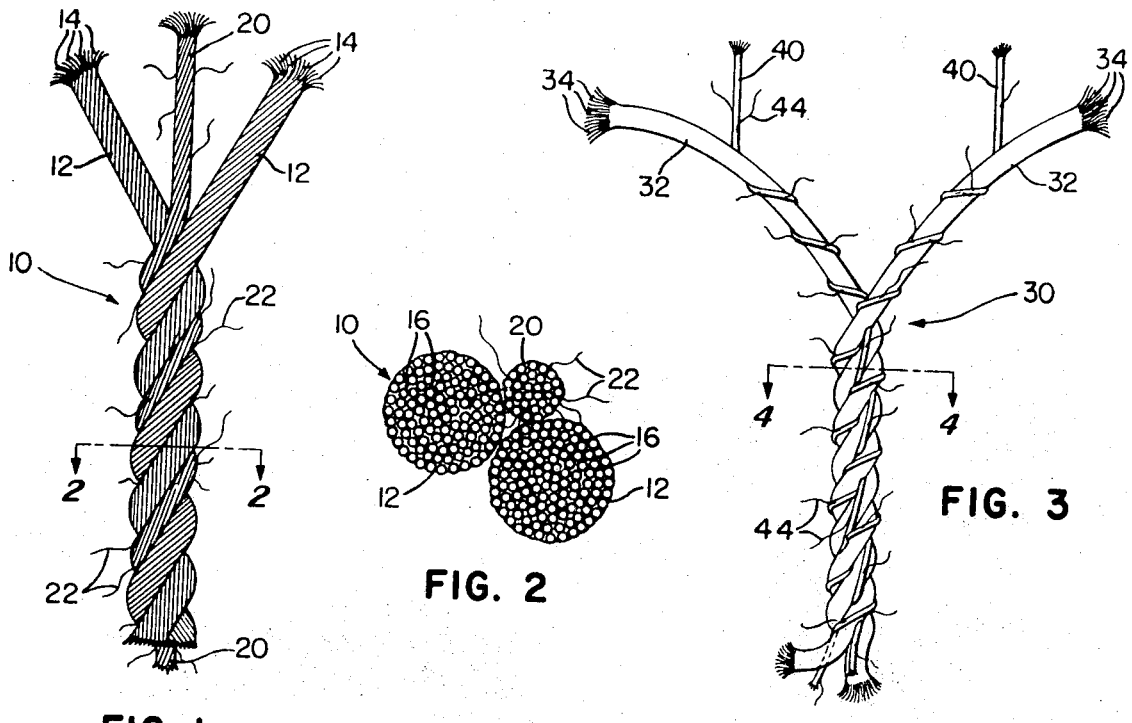
FIG. 1 is a view of a representative length of a tire reinforcement cord according to the instant invention.
FIG. 2 is a cross-section of the cord taken along the line 2—2 of FIG. 1.
FIG. 3 is a view of a portion of length of a reinforcement cord in accordance with a further aspect of the present invention.

In the drawings, particularly FIGS. 1 and 2, a reinforcement cord 10 comprises a plurality of yarns 12 each made up of a multiplicity of individual continuous filaments 14 plied together in the usual manner by twisting the yarns 12 about one another. In the particular cord here being described the filaments are polyester, a thermoplastic synthetic resin polymer, there being in each yarn 12, 250 filaments having a total weight of 1,000 denier. The amount and direction of twist in the yarns 12 and in the cord 10 are conventional and need not be described here. The cord may, when desired, consist of a single yarn of multiple continuous filaments.

The multiplicity of individual continuous filaments 14 provide in the yarn 12 inter-filamentary voids or spaces 16 which are generally continuous throughout the length of the yarns and can act as passages through which gases may flow or migrate. As mentioned previously herein conventional treatments of reinforcement cord tend to reduce the voids or spaces between the filaments. The adhesives customarily used to provide the bonds between the reinforcement cord and the surrounding rubber of the tire penetrate partially but not wholly into the cord and thus occupy and to some extent also reduce the inter-filamentary void volume. In the polyester cord here being described the void volume has been measured by conventional pyonometric methods and determined to be about 7 or 8 percent of the gross volume occupied by the continuous filaments of the cord.

According to the invention the void volume available for the reception and retention of compressible gases such as air is increased to a satisfactory value of at least 10 percent and preferably about 12 percent by plying with each cord a yarn 20 of staple fibers such that the yarn 20 comprises from about 5 percent to not more than 35 percent of the combined weight of the cord including the yarn 20. The weight of the staple yarn 20 of from about 9 percent to about 15 percent has been found very satisfactory, and in the particular cord being described comprises 10 ½ percent by weight of the composite cord. The total gas receiving void volume achieved is in excess of 11 percent.

The yarn 20 may comprise any staple fiber but is preferably cellulosic in origin and particularly should not be thermoplastic. In the embodiment here described the yarn is a singles yarn of 23's count or approximately 230 denier. The function of the yarn 20 is to provide an increase in the total voids volume of the composite cord 10 such that air or other compressible gases can be received in that void volume, forced to migrate thereinto by pressure applied upon the surfaces of the tire when the tire is placed in the mold. Cotton and other staple or non-thermoplastic fibers experience relatively little reduction in inter-fiber or inter-filamentary void volume when undergoing hot-stretch treatments. Thus the desired additional void volume in the composite cord is preserved and remains available for the reception and retention of gases after hot-stretch treatment. The yarn 20 is not intended to contribute either tensile strength or bulk to the composite cord.

Individual fibers or small fiber bundles 22 extend from the surface of the staple yarn 20 and are observed to enter at least to a limited extent into the inter-filamentary passages 16 during the twisting and subsequent handling of the cord and fabric. This effect is believed to have at least a tendency to increase the total voids volume, or inter-filamentary and inter-fiber space, available for the reception of gas by the composite cord 10 at least slightly above the void volume which might be expected from consideration of the independently measured void volumes of each. While some void volume is available within the individual fibers the chief gas receiving and retaining volume is in the inter-fiber of inter-filamentary interstices 16 of the composite cord 10 which includes the yarn 20.

Figures 4, 6:
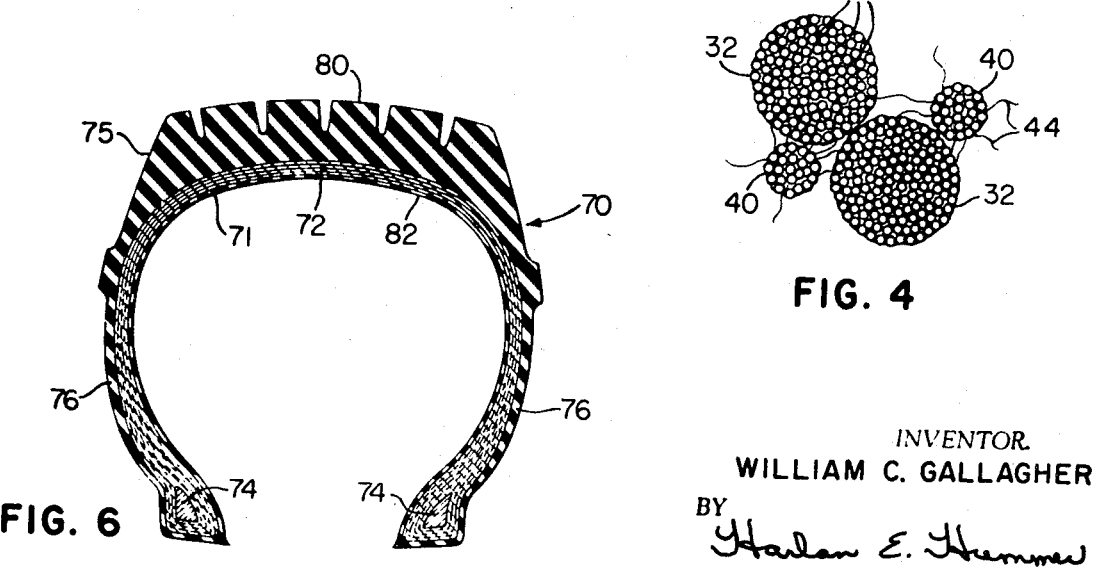
FIG. 4 is a cross-section of the cord taken along the line 4—4 of FIG. 3.
FIG. 6 is a transverse section of a tire in accordance with the invention.

Turning now to FIGS. 3 and 4 of the drawings, a cord 30 includes a plurality of yarns 32 each comprising a multiplicity of individually continuous filaments 34 having inter-filamentary void spaces 36 of the type previously described herein. Plied together with each yarn 32 in accordance with the present invention there is a staple yarn 40 comprising staple fibers, nonthermoplastic and preferably cellulosic in origin, cotton and staple rayon being preferred. The continuous individual filaments 34 are of synthetic resin material such as polyester or nylon and are conventionally treated as by hot-stretching in the manner previously mentioned. As in the case of the composite cord 10 which includes the yarn 20, the yarns 40 are not intended to contribute to the tensile strength of the reinforcement cord 30 but rather to increase the available voids volume beyond that which is provided by the inter-filamentary spaces 36 in the yarns 34 alone. In the same manner as described in connection with the fiber ends 22 of the yarn 20, fiber ends 44 of the yarns 40 tend to protrude from the yarns and to enter the inter-filamentary spaces 36 in the yarns 32 so that the total voids volume of the composite cord 30 is increased at least slightly beyond the voids volume which would be expected.

In accordance with the invention the yarns 40 comprise from about 5 percent to about 35 percent by weight of the composite yarn 32, the minimum weight proportion of the yarns 40 being determined primarily by the fact that weights of less than about 5 percent become difficult to handle in twisting or plying operations. The maximum fractional weight of 35 percent of the composite cord 30 has been determined to increase the total inter-filamentary and inter-fiber void volume or space for the reception of gas above about 11 percent at which level it has been found that the occurrence of blow or blister defects in tires are substantially eliminated.

The table below presents the results of a series of production line comparison test runs illustrative of the effects accomplished by the practice of the instant invention.

COMPARATIVE TESTS IN NORMAL PRODUCTION OF TRACTOR TIRES

| Conventional cord fabric reinforcement | | | Fabric with gas receiving cord fabric of the invention | | |
|---|---|---|---|---|---|
| Quantity | Number blows | Percent | Quantity | Number blows | Percent |
| 262 | 20 | 7.64 | 159 | 2 | 1.26 |
| 796 | 6 | .75 | 576 | 1 | 0.17 |
| 72 | 2 | 2.78 | 77 | 0 | 0.0 |

It will be apparent from the foregoing table that tires produced in accordance with the invention are significantly less susceptible to blows and like defects.

Figure 5:
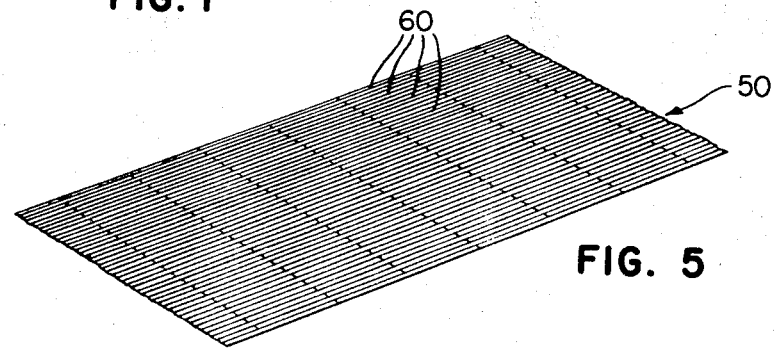
FIG. 5 is a perspective view of a portion of a reinforcing ply comprising cords according to FIG. 1 or FIG. 3.

In accordance with the invention a tire ply fabric, FIG. 5, includes composite cords 60. The individual composite cords 60 each comprise one or more yarns of a multiplicity of individual continuous filaments and at least one yarn of staple fiber, the cord 60 having the characteristics of the composite cord 10, or of the composite cord 30, which have been described herein.

In order to reduce the incidence of blow or blister defects in pneumatic tires such as the tire represented in FIG. 6 the tire 70 is constructed in accordance with the usual conventional procedures in which a liner 71, a plurality of reinforcement plies 72, of which at least one ply includes the ply fabric 50 comprising the composite cords 60, are successively placed upon a building form or drum (not shown). In the usual manner the plies 72 are turned around beads 74. Rubber material comprising the tread 75 and sidewall 76 portions is applied to complete the tire body assembly. The tire 70 is then placed into a tire mold (not shown) and pressure is applied by means of a conventional bag or bladder (not shown) which causes pressure engagement between the mold cavity surface and the exterior surface of the tire. The pressure thus applied both to the exterior 80 and interior 82 surfaces operates to compel the movement or migration of gases which may be contained within the body of the tire into and along the passages between the filaments 14 or 34, such as the passages 16 or 36, and particularly into the inter-fiber passages, spaces or void volume provided by the staple yarns 20, 40, such as those described in connection with FIGS. 1 through 4. The pressure applied to the surfaces of the tire by the mold and by the bladder not only causes the compressible gases within the body of the tire to enter and move along within the inter-filamentary and inter-fiber void spaces but compresses such gas to lesser volume in proportion to the applied pressure which volume may be as little as one-tenth of the air or gas volume at normal pressure. In accordance with the invention the space or volume provided by the inter-filamentary and inter-fiber voids or spaces is made sufficient so that the air contained within the tire, either by having been trapped between the rubber of the tread and sidewall and the plies or between the plies themselves during assembly thereof, or which may have migrated into the tire during the time lapse between the building and the curing operations, can be contained within such inter-filamentary or inter-fiber void space. By being contained within the void space the gases are prevented from the interfering in any way with the satisfactory development of proper adhesive bonds between the plies and between the plies and the rubber of the tire.

As has been shown herein, tires made in accordance with the present invention using the means and methods described are conspicuously less susceptible to defects of blisters or blows.

The terms "voids" or "voids volume" or "void space" as used herein and in the claims hereto appended mean the space or volume within the overall dimensions of the yarn or cord and which space is available to be occupied by air or compressible gas in and between the solid elements comprising the substance of the fiber or filament. The terms "staple yarn" and "staple fiber" as used herein mean fibers which either by the nature of their origin or by an operation of cutting are in relatively short lengths ranging from a fraction of one inch to several inches and are so distinguished from the continuous filaments comprising the strength members of the reinforcing cord.

While certain representative embodiments and details have been shown for the purpose of illustrating the invention, it will be apparent to those skilled in this art that various changes and modifications may be made therein without departing from the spirit or scope of the invention.

What is claimed is:

1. The method of reducing the incidence of blow or blister defects in pneumatic tires having reinforcement plies including cords of continuous filaments, said method comprising: plying with each cord of at least one of said reinforcement plies a yarn of staple fiber, said yarn having a voids volume of at least 20 percent and being not more than 35 percent by weight of said cord including said yarn; placing said ply within the body of a tire while building said tire; applying pressure on the surfaces of said tire to compel gas contained within said tire to move into inter-filamentary and inter-fiber spaces within said cord and said yarn; and then curing said tire.

2. The method of claim 1, wherein each cord and yarn are plied together such that the resulting cord has a gas receiving inter-filamentary and inter-fiber void volume of at least 10 percent of the volume of said resulting cord.

3. The method of claim 2, wherein the continuous filaments are thermoplastic and the staple fibers are cellulosic.

4. The method of claim 3, wherein the staple fibers are cotton.

5. The method of claim 4, wherein the continuous filaments are polyester.

* * * * *